(12) United States Patent
Mochizuki

(10) Patent No.: US 9,222,506 B2
(45) Date of Patent: Dec. 29, 2015

(54) ROLLING BEARING APPARATUS

(75) Inventor: Shogo Mochizuki, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/388,872

(22) PCT Filed: Jul. 26, 2012

(86) PCT No.: PCT/JP2012/069048
§ 371 (c)(1),
(2), (4) Date: Sep. 29, 2014

(87) PCT Pub. No.: WO2013/145355
PCT Pub. Date: Oct. 3, 2013

(65) Prior Publication Data
US 2015/0043850 A1 Feb. 12, 2015

(30) Foreign Application Priority Data
Mar. 30, 2012 (JP) ................................. 2012-078686

(51) Int. Cl.
*F16C 43/04* (2006.01)
*F16C 19/38* (2006.01)
*F16C 35/063* (2006.01)
*F16C 33/58* (2006.01)
(Continued)

(52) U.S. Cl.
CPC ............... *F16C 19/38* (2013.01); *F16C 25/083* (2013.01); *F16C 33/58* (2013.01); *F16C 33/586* (2013.01); *F16C 35/063* (2013.01); *F16C 35/073* (2013.01); *F16C 19/388* (2013.01); *F16C 2226/76* (2013.01)

(58) Field of Classification Search
CPC .............................. F16C 35/07; F16C 35/073
USPC ........................................ 384/537, 584, 585
See application file for complete search history.

(56) References Cited

U.S. PATENT DOCUMENTS 1,761,490 A * 6/1930 Penner ........................... 384/585
1,812,784 A * 6/1931 Hawley, Jr. .................... 384/585
(Continued)

FOREIGN PATENT DOCUMENTS

| DE | 2603685 A1 * | 8/1977 |
| JP | 02-148704 U | 12/1990 |
| JP | 2009236287 A * | 10/2009 |

(Continued)

OTHER PUBLICATIONS

International Search Report for PCT/JP2012/069048 dated Oct. 23, 2012 [PCT/ISA/210].

(Continued)

*Primary Examiner* — Phillip A Johnson
(74) *Attorney, Agent, or Firm* — Sughrue Mion, PLLC

(57) ABSTRACT

In a creep preventing rolling bearing apparatus 21, an inner ring 12 is provided with a first key groove 13 opened at an inner peripheral face 12*i* in an axial end portion 12*t*. The first key groove 13 is provided so as to have a predetermined length L in the axial direction from the axial end portion 12*t* at a position having a certain depth D from an outer peripheral face 12*o* in a radial direction. A rotation shaft 17 is provided with a second key groove 13' on an outer peripheral face 17*o* along an axial direction. The first key groove 13 and the second key groove 13' are aligned and a key 18 is inserted, whereby the first key groove 13 and the second key groove 13' are fixed at the same time.

8 Claims, 7 Drawing Sheets

(51) Int. Cl.
*F16C 35/073* (2006.01)
*F16C 25/08* (2006.01)

(56) References Cited

U.S. PATENT DOCUMENTS 5,322,374 A * 6/1994 Takata .................... 384/563
6,485,188 B1 * 11/2002 Dougherty ............... 384/589

FOREIGN PATENT DOCUMENTS

JP 2010-048301 A 3/2010
JP 2011-174571 A 9/2011

OTHER PUBLICATIONS

Written Opinion for PCT/JP2012/069048 dated Oct. 23, 2012 [PCT/ISA/237].

* cited by examiner (a)

(b)

ROLLING BEARING APPARATUS

TECHNICAL FIELD

The present invention relates to a rolling bearing apparatus, and more particularly, to a rolling bearing apparatus for use at a roll neck of a rolling mill.

BACKGROUND ART

Conventionally, bearing apparatuses are used for the purpose of supporting a roll neck part, which is a shaft portion of a mill roll. In such bearing apparatuses, the mill roll is gradually worn while steel sheets are rolled, and therefore, it is necessary to frequently replace the mill roll. Accordingly, the bearing and the roll neck part are attached to each other with a predetermined fitting clearance between them, in a so-called loose fit manner. Thus, there has been a problem that a slippage occurs between an inner ring of the bearing and the roll neck part during operation of the mill roll, resulting in wear of the roll neck part having a lower hardness. In order to prevent this slippage, as shown in FIG. 5, a first key groove 62 is formed on one end face of an inner ring 61, and a second key groove 64 is formed on an outer peripheral face of a roll neck part 63. One end of a first key 65 is inserted into and locked to the first key groove 62, and an L-shaped other end of the first key 65 is inserted into and engaged with the second key groove 64. As a result, a relative slippage (called as "a creep") between the inner ring 61 and the roll neck part 63 is prevented at one side of the inner ring 61, and wear of the roll neck part 63 having a lower hardness as compared with the inner ring 61 can be prevented (see, e.g., Patent Document 1).

In a conventional creep preventing rolling bearing apparatus 71, as shown in FIG. 6, by providing a cutout groove in a part of an inner ring 72 in an axial direction of a rolling bearing 76, there is formed a key groove 73 opened at an inner peripheral face 72$i$ and at an outer peripheral face 72$o$ of the inner ring 72. A second key groove 73' is formed on an outer peripheral face 77$o$ of a rotation shaft 77 along an axial direction f. By aligning the first key groove 73 and the second key groove 73' and inserting a key 78, a creep between the inner ring 72 and the rotation shaft 77 is prevented (hereinafter, referred to as "an open type rolling bearing").

In another conventional creep preventing rolling bearing apparatus 81, as shown in FIG. 7, intrusion of foreign matters from the exterior is prevented by providing a seal 89 for tight sealing on an outer side of a rolling bearing 86. To seal an internal space between an outer ring 85 and an inner ring 82 from outside the bearing, an outer peripheral face 89$o$ of the seal 89 is fitted and fixed to an axial end portion of an inner peripheral face 85$i$ of the outer ring 85, and a lip 89$i$ of the seal 89 is arranged to be in sliding contact with an outer peripheral face 82$o$ of the inner ring 82. To prevent the lip 89$i$ of the seal 89 from contacting a first key groove 83 of the inner ring 82, the first key groove 83 is located axially inward of the inner ring 82 with respect to the seal 89, (hereinafter referred to as "a sealed rolling bearing").

PRIOR ART DOCUMENT

Patent Document

Patent Document 1: JP 02-148704 U

SUMMARY OF THE INVENTION

Problems that the Invention is to Solve

In the conventional sealed rolling bearing as described above, the seal 89 is provided in the axial end portion of the rolling bearing 86. Accordingly, the axial length Ls of a rolling element 84 of the sealed rolling bearing needs to be made shorter as compared with the axial length Lo of a rolling element 74 of the open type rolling bearing not provided with a seal. Therefore, there is a problem that a basic dynamic load rating is remarkably lowered.

Here, the "basic dynamic load rating" means a load not varying in direction and amount and which makes the rated fatigue life one million rotations, with a condition that the inner ring 72, 82 is rotated and the outer ring 75, 85 is fixed.

According to Patent Document 1, to increase a contact area of the first key 65, the inner ring 61 is extended so that an end face of the inner ring 61 protrudes in the axial direction than a seal unit 68, and the first key groove 62 is formed by cutting a portion of the one end face of the inner ring 61. Accordingly, stress concentration may occur at an edge part of the first key groove that is cut out. Moreover, for the purpose of ensuring the basic dynamic load rating, a portion for providing the first key groove 62 had to be provided in the inner ring 61, which hinders downsizing of the entire bearing.

The present invention has been made in view of the problems above described, and it is an object thereof to provide a creep preventing rolling bearing apparatus in which stress concentration at a key groove can be relieved while ensuring the basic dynamic load rating.

Means for Solving the Problems

The invention is directed to a rolling bearing apparatus comprising:

a rolling bearing comprising an outer ring, an inner ring having a first key groove formed along an axial direction on an inner peripheral face of an axial end portion of the inner ring, and a plurality of rolling elements held between the inner ring and the outer ring in a rollable manner;

a rotation shaft having a second key groove on an outer peripheral face thereof on which the rolling bearing is incorporated; and a key inserted into the first key groove and the second key groove, characterized in that the first key groove is opened at the inner peripheral face of the inner ring in the axial end portion of the inner ring, and the first key groove is formed so as to have a predetermined length in the axial direction from the axial end portion of the inner ring at a position having a certain depth from an outer peripheral face of the inner ring in a radial direction.

Advantage of the Invention

According to the present invention, it is possible to provide a creep preventing rolling bearing apparatus in which stress concentration at the key groove can be relieved while ensuring the basic dynamic load rating.

EMBODIMENTS OF THE INVENTION

Hereinafter, with reference to the drawings, respective embodiments of the present invention will be described. A first embodiment is an example in which a key and a key groove have a wedge shape, a second embodiment is an example in which a key and a key groove have a prism shape, and a third embodiment is an example in which a key has a cylindrical shape and a key groove has a shape of a semicircular groove.

First Embodiment

Figure 1:
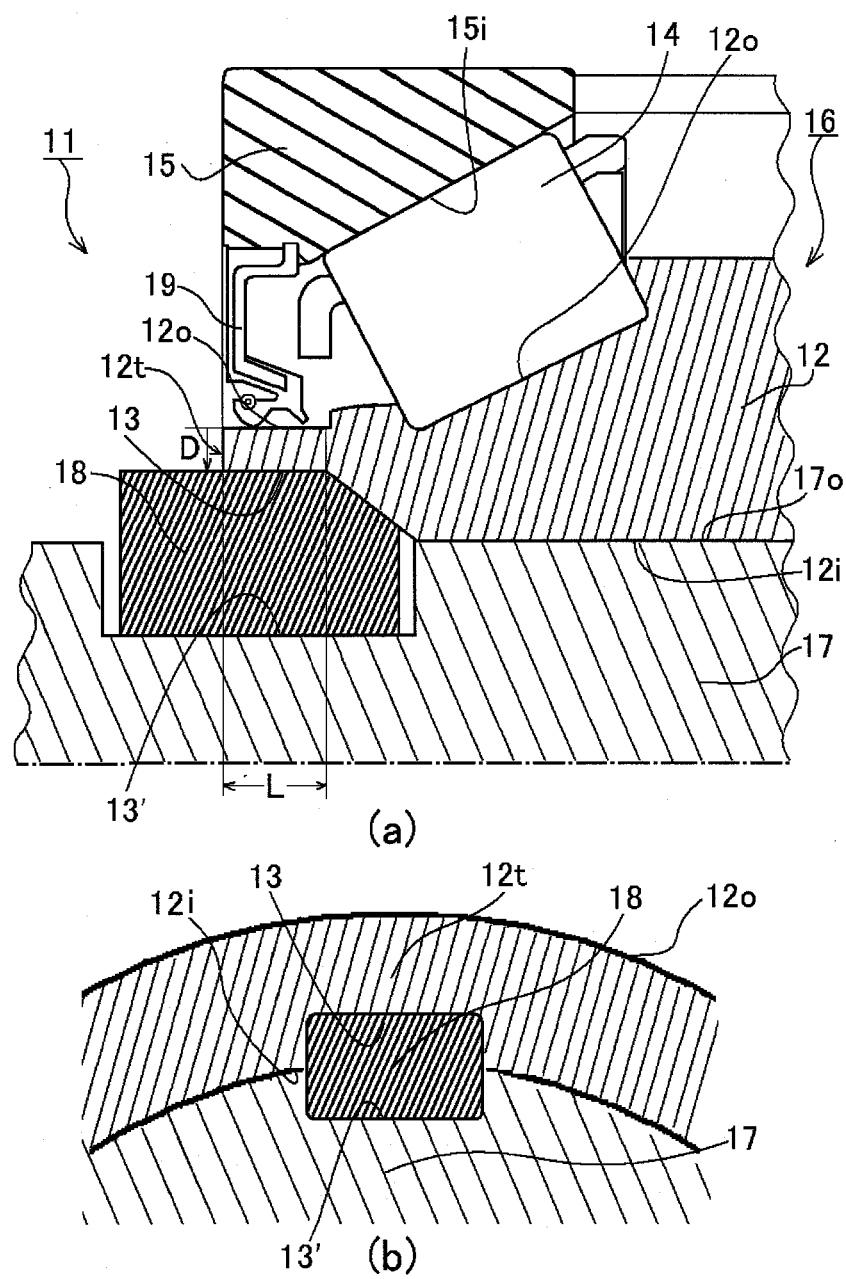
FIG. 1($a$) is a vertical sectional view illustrating a main portion of a sealed rolling bearing apparatus according to a first embodiment of the present invention, and FIG. 1($b$) is a cross sectional view illustrating a key structure of the sealed rolling bearing apparatus of FIG. 1($a$)

FIG. 1(a) is a vertical sectional view illustrating a main portion of a sealed rolling bearing apparatus 11 according to the first embodiment of the present invention, and FIG. 1(b) is a cross sectional view illustrating a key structure of the sealed rolling bearing apparatus 11 of FIG. 1(a).

As shown in FIG. 1(a), the sealed rolling bearing apparatus 11 includes a rolling bearing 16 having an inner ring 12 provided with a first key groove 13 in its axial end portion 12t, a plurality of rolling elements 14 held on an outer peripheral face 12o of the inner ring 12 in a rollable manner, and an outer ring 15 provided with a raceway face for the rolling elements 14 on its inner peripheral face 15i. The sealed rolling bearing apparatus 11 further includes a rotation shaft 17, and a key 18. The rotation shaft 17 on which the rolling bearing 16 is incorporated is provided with a second key groove 13' on its outer peripheral face 17o. The key 18 is inserted in a state in which the first key groove 13 and the second key groove 13' are aligned.

The first key groove 13 is provided in the axial end portion 12t of the inner ring 12 and is opened at an inner peripheral face 12i. The first key groove 13 is formed so as to have a predetermined length L in the axial direction from the axial end portion 12t of the inner ring 12 at a position having a certain depth D from the outer peripheral face 12o in a radial direction. The first key groove 13 has a substantially quadrangular cross section. The end of the first key groove 13 is obliquely cut. A seal 19 for tight sealing is provided on an outer side of the rolling bearing 16 for the purpose of preventing intrusion of foreign matters.

Figure 2:
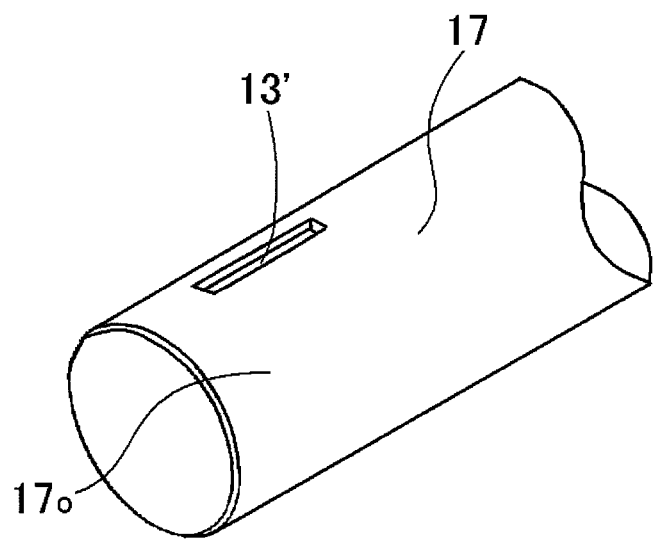
FIG. 2 is a perspective view of a rotation shaft shown in FIGS. 1($a$) and 1($b$)

FIG. 2 is a perspective view of the rotation shaft shown in FIGS. 1(a) and 1(b). As shown in FIG. 2, the second groove 13' in a shape of an angular groove is provided on the outer peripheral face 17o of the rotation shaft 17 along the axial direction. As shown in FIGS. 1(a) and 1(b), by aligning the first key groove 13 provided in the inner ring 12 and the second key groove 13' provided in the rotation shaft 17, a continuous key groove having a wedge shape is formed. By inserting the key 18 having a wedge shape into this key groove, the first key groove 13 and the second key groove 13' are fixed at the same time.

According to the sealed rolling bearing apparatus 11 of the first embodiment, the first key groove 13 opened at the inner peripheral face 12i is provided in the axial end portion 12t of the inner ring 12 of the rolling bearing 16, and the second key groove 13' contiguous with the first key groove 13 is provided on the outer peripheral face 17o of the rotation shaft 17 along the axial direction. The key 18 having the shape of a wedge is inserted into and engaged with the key groove formed by aligning the positions of the first key groove 13 and the second key groove 13'. As a result, the first key groove 13 formed in the inner ring 12 and the second key groove 13' formed in the rotation shaft 17 are fixed at the same time, and thus, a creep between the inner ring 12 and the rotation shaft 17 can be prevented.

Moreover, according to the sealed rolling bearing apparatus 11 of the first embodiment, the first key groove 13 having a shape of a substantially angular groove is formed so as to have the predetermined length L in the axial direction from the axial end portion 12t of the inner ring 12 at the position having the certain depth D from the outer peripheral face 12o of the inner ring 12 in the radial direction. As a result, a force exerted on an edge part of the first key groove 13 is dispersed, and therefore, it is possible to relieve stress at the key groove as compared with the conventional creep preventing rolling bearing apparatus 71.

Second Embodiment

Figure 3:
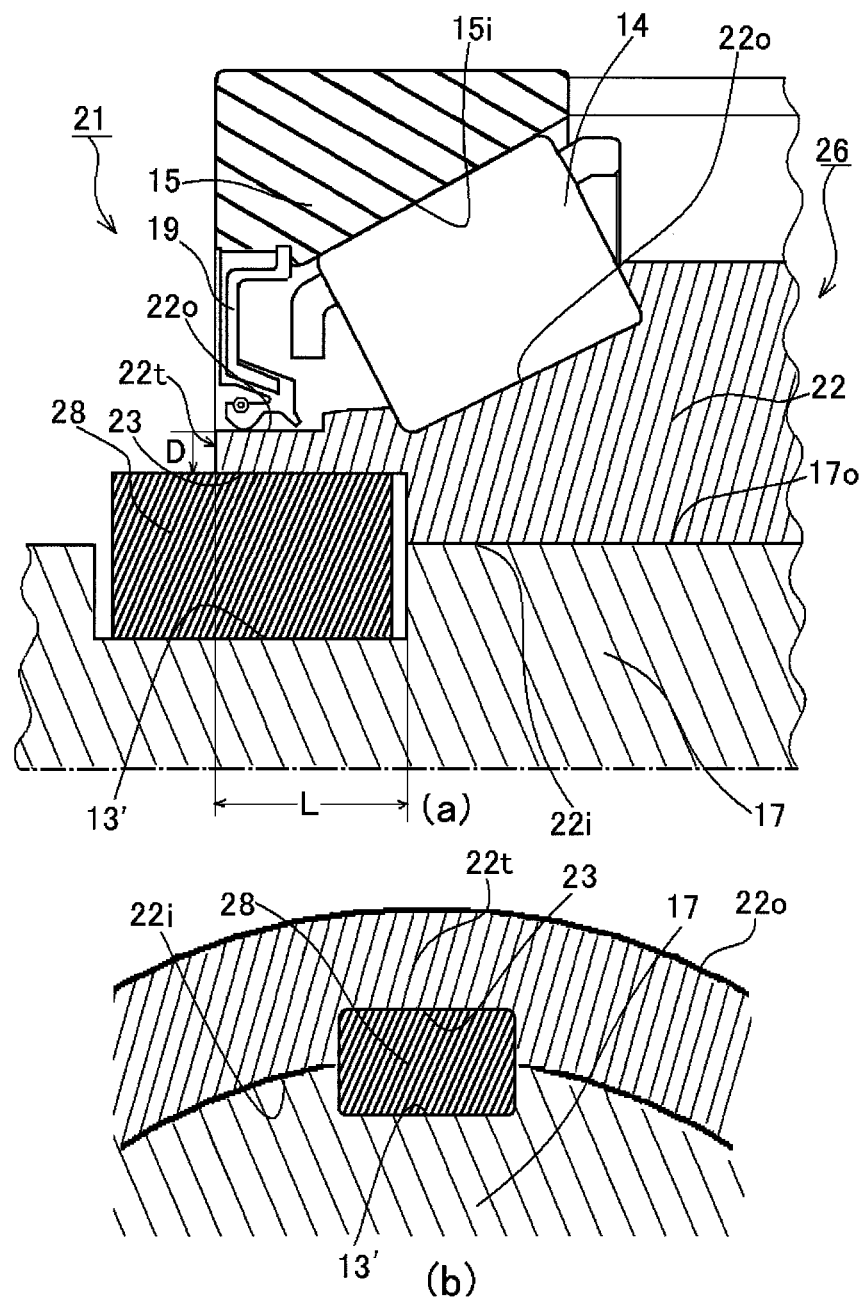
FIG. 3($a$) is a vertical sectional view illustrating a main portion of a sealed rolling bearing apparatus according to a second embodiment of the present invention, and FIG. 3($b$) is a cross sectional view illustrating a key structure of the sealed rolling bearing apparatus of FIG. 3(a)

FIG. 3(a) is a vertical sectional view illustrating a main portion of a sealed rolling bearing apparatus 21 according to the second embodiment of the present invention, and FIG. 3(b) is a cross sectional view illustrating a key structure of the sealed rolling bearing apparatus 21 of FIG. 3(a). Those parts corresponding to the preceding drawings are denoted with the same reference numerals, and descriptions thereof will be omitted.

As shown in FIGS. 3(a) and 3(b), a first key groove 23 is provided in an axial end portion 22t of an inner ring 22 and is opened at an inner peripheral face 22i. The first key groove 23 is formed so as to have a predetermined length L in the axial direction from the axial end portion 22t of the inner ring 22 at a position having a certain depth D from an outer peripheral face 22o in a radial direction. The first key groove 23 has a substantially quadrangular cross section. A seal 19 for tight sealing is provided on an outer side of a rolling bearing 26 for the purpose of preventing intrusion of foreign matters.

Like in the first embodiment, as shown in FIG. 2, the second groove 13' in a shape of an angular groove is provided on the outer peripheral face 17o of the rotation shaft 17 along the axial direction. As shown in FIGS. 3(a) and 3(b), a continuous key groove in a shape of an angular groove is formed, by aligning the first key groove 23 provided in the inner ring 22 and the second key groove 13' provided in the rotation shaft 17. By inserting a key 18 having a quadrangular prism shape into this key groove, the first key groove 23 and the second key groove 13' are fixed at the same time.

According to the sealed rolling bearing apparatus 21 of the second embodiment, the first key groove 23 opened at the inner peripheral face 22i is provided in the axial end portion 22t of the inner ring 22 of the rolling bearing 26, and the second key groove 13' contiguous with the first key groove 13 is provided on the outer peripheral face 17o of the rotation shaft 17 along the axial direction. The key 28 having the quadrangular prism shape is inserted into and engaged with the key groove formed by aligning positions of the first key groove 23 and the second key groove 13'. As a result, the first key groove 23 formed in the inner ring 22 and the second key groove 13' formed in the rotation shaft 17 are fixed at the same time, and thus, a creep between the inner ring 22 and the rotation shaft 17 can be prevented.

Moreover, according to the sealed rolling bearing apparatus 21 of the second embodiment, the first key groove 23 having a shape of a substantially angular groove is formed so as to have the predetermined length L in the axial direction from the axial end portion 22t of the inner ring 22 at the position having the certain depth D from the outer peripheral face 22o of the inner ring 22 in the radial direction. As a result, a force exerted on an edge part of the first key groove 23 is dispersed, and therefore, it is possible to enhance the basic dynamic load rating, as compared with the conventional creep preventing rolling bearing apparatus in which the key groove is formed by cutting a part of an end portion of the inner ring extended in an axial direction of the bearing.

Third Embodiment

FIG. 4(a) is a vertical sectional view illustrating a main portion of a sealed rolling bearing apparatus 31 according to a third embodiment of the present invention, and FIG. 4(b) is a cross sectional view illustrating a key structure of the sealed rolling bearing apparatus of FIG. 3(a). Those parts corresponding to the preceding drawings are denoted with the same reference numerals and descriptions thereof will be omitted.

Figure 4:
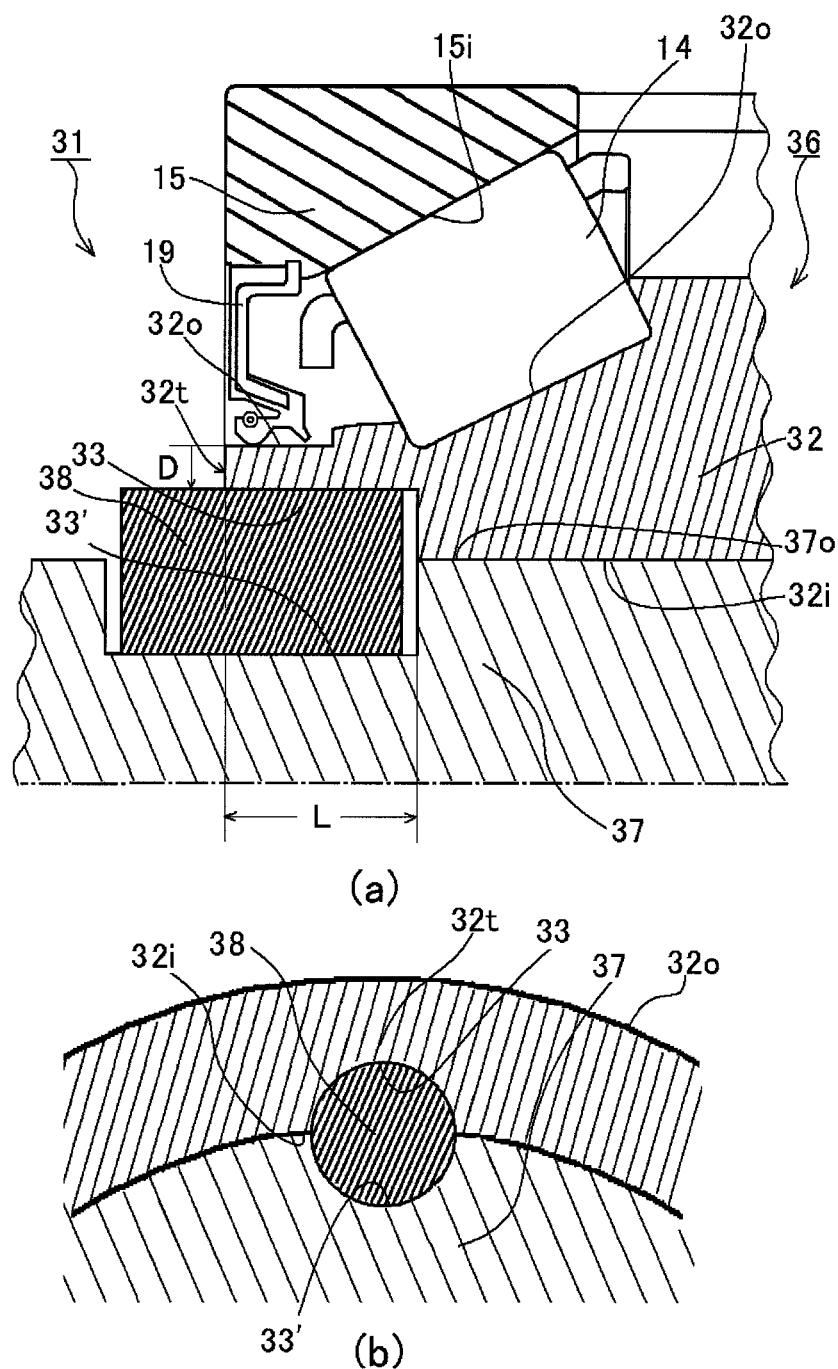
FIG. 4(a) is a vertical sectional view illustrating a main portion of a sealed rolling bearing apparatus according to a third embodiment of the present invention.
FIG. 4(b) is a cross sectional view illustrating a key structure of the sealed rolling bearing apparatus of FIG. 4(a)
Figure 5:
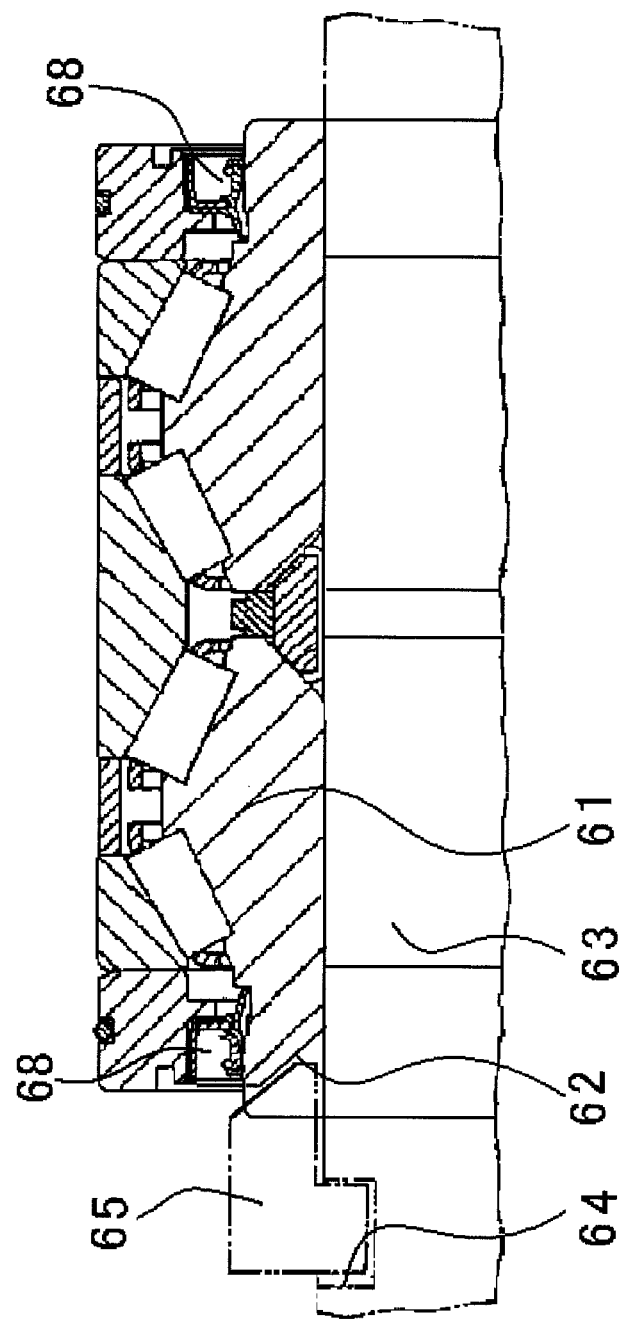
FIG. 5 is a vertical sectional view illustrating a main portion of a conventional bearing apparatus for a rolling mill.
Figure 6:
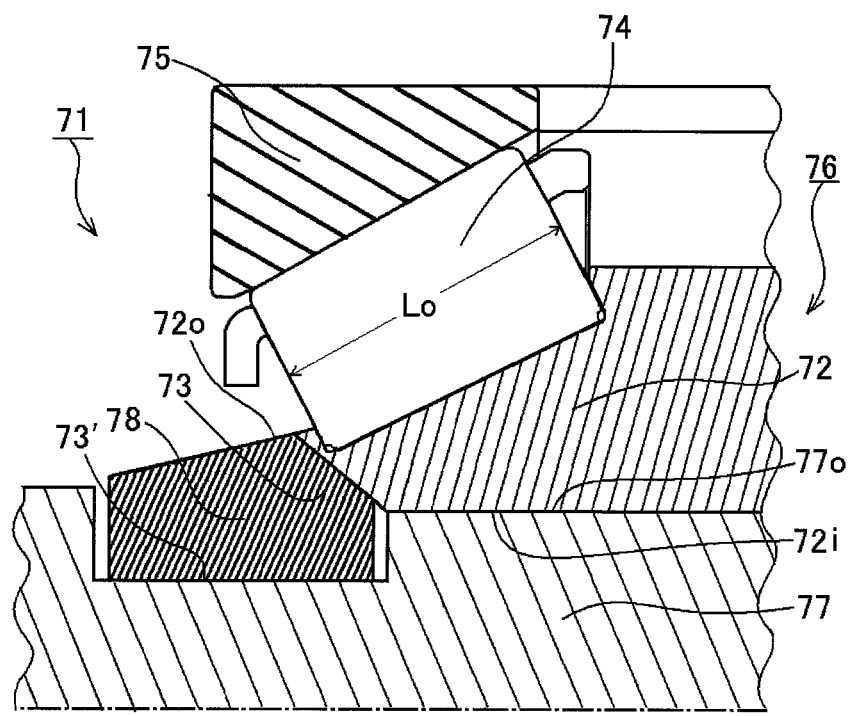
FIG. 6 is a vertical sectional view illustrating a main portion of a conventional rolling bearing apparatus.
Figure 7:
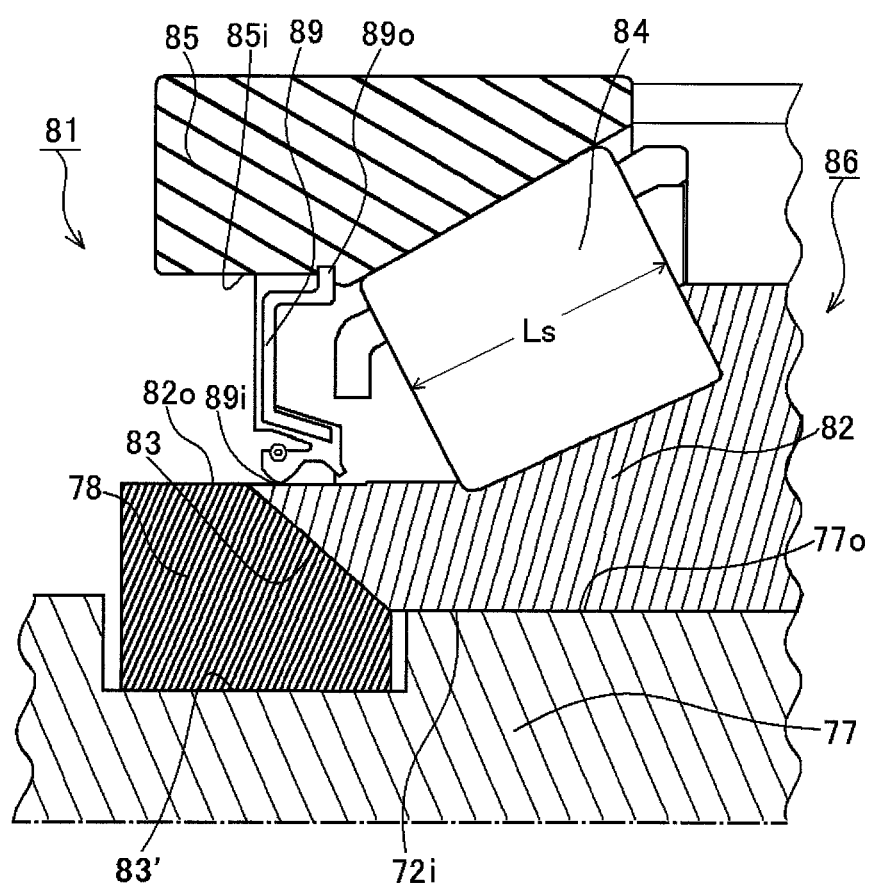
FIG. 7 is a vertical sectional view illustrating a main portion of another conventional rolling bearing apparatus.

As shown in FIG. 4, a first key groove 33 is provided in an axial end portion 32t of an inner ring 32 and is opened at an inner peripheral face 32i. The first key groove 33 is formed so as to have a predetermined length L in the axial direction from the axial end portion 32t of the inner ring 32 at a position having a certain depth D from an outer peripheral face 32o in a radial direction. The first key groove 33 has a substantially semicircular cross section. A seal 19 for tight sealing is provided on an outer side of a rolling bearing 36 for the purpose of preventing intrusion of foreign matters.

As shown in FIGS. 4(a) and 4(b), a rotation shaft 7 is provided with a second key groove 33' on its outer peripheral face 37o along an axial direction thereof. The second key groove 33' has a substantially semicircular shape in section. A continuous key groove having a circular section is formed, by aligning the first key groove 33 provided in the inner ring 32 and the second key groove 33' provided in the rotation shaft 37. By inserting a key 38 having a cylindrical shape into this key groove, the first key groove 33 and the second key groove 33' are fixed at the same time.

According to the sealed rolling bearing apparatus 31 of the third embodiment, the first key groove 33 opened at the inner peripheral face 32i is provided in the axial end portion 32t of the inner ring 32 of the rolling bearing 36, and the second key groove 33' contiguous with the first key groove 33 is provided on the outer peripheral face 37o of the rotation shaft 37 along the axial direction. The key 38 having the cylindrical shape is inserted into and engaged with the key groove formed by aligning positions of the first key groove 33 and the second key groove 33'. As a result, the first key groove 33 formed in the inner ring 32 and the second key groove 33' formed in the rotation shaft 37 are fixed at the same time, and thus, a creep between the inner ring 32 and the rotation shaft 37 can be prevented.

Moreover, according to the sealed rolling bearing apparatus 31 of the third embodiment, the first key groove 33 is formed so as to have the predetermined length L in the axial direction from the axial end portion 32t of the inner ring 32 at the position having the certain depth D from the outer peripheral face 32o of the inner ring 22 in the radial direction. As a result, a force exerted on an edge part of the first key groove 33 is dispersed to the cylindrical surface, and therefore, it is possible to relieve stress at the first key groove 33.

While embodiments and examples of the present invention have been described above, the present invention is not limited to the embodiments described above, and can be implemented with various modifications within a scope defined by the claims. The present application is based on Japanese Patent Application No. 2012-78686 filed on Mar. 3, 2012, the content of which is incorporated herein by reference.

DESCRIPTION OF THE REFERENCE SIGNS 11, 21, 31 Creep preventing rolling bearing apparatus
16, 26, 36 Rolling bearing
12, 22, 32, 72, 82 Inner ring
13, 23, 33 First key groove
13', 33' Second key groove
14, 74, 84 Rolling element
15, 85 Outer ring
17, 37 Rotation shaft
18, 28, 38, 78 Key

The invention claimed is:

1. A rolling bearing apparatus comprising:
   a rolling bearing comprising an outer ring, an inner ring having a first key groove formed along an axial direction on an inner peripheral face of an axial end portion of the inner ring, and a plurality of rollers held between the inner ring and the outer ring in a rollable manner;
   a rotation shaft having a second key groove on an outer peripheral face thereof on which the rolling bearing is incorporated;
   a key inserted into the first key groove and the second key groove, and
   a seal provided between the inner and outer rings at the axial end portion of the inner ring;
   wherein the first key groove is opened at the inner peripheral face of the inner ring in the axial end portion of the inner ring, and
   wherein the first key groove is formed so as to have a predetermined length in the axial direction from the axial end portion of the inner ring at a position having a certain depth from an outer peripheral face of the inner ring in a radial direction,
   wherein the key is in a shape of a quadrilateral prism or cylinder.

2. The rolling bearing apparatus of claim 1, wherein the second key groove of the rotation shaft extends outward beyond the axial end portion of the inner ring.

3. The rolling bearing apparatus of claim 1, wherein the plurality of rollers comprises tapered rollers.

4. The rolling bearing apparatus of claim 1, wherein a rotation axis of the roller is inclined relative to the rotation shaft proceeding toward the axial end portion of the inner ring.

5. A rolling bearing apparatus for supporting a roll neck of a rolling mill, the apparatus comprising:
   a rolling bearing comprising:
      an outer ring,
      an inner ring comprising an inner peripheral face, an outer peripheral face, and a first key groove formed on the inner peripheral face at an axial-most end portion of the inner ring,
      a plurality of rollers between the inner ring and the outer peripheral face;

a rotation shaft having a second key groove on an outer peripheral face thereof on which the rolling bearing is incorporated; and a key configured to be inserted into the first key groove and the second key groove, wherein a surface of the first key groove extends in the axial direction from the axial-most end portion of the inner ring to a position short of the rollers, and wherein the first key groove is opened at the inner peripheral face of the inner ring in an axial-most end portion of the inner ring.

6. A rolling bearing apparatus comprising:

a rolling bearing comprising an outer ring, an inner ring having a first key groove formed along an axial direction on an inner peripheral face of an axial end portion of the inner ring, and a plurality of rollers held between the inner ring and the outer ring in a rollable manner;

a rotation shaft having a second key groove on an outer peripheral face thereof on which the rolling bearing is incorporated;

a key inserted into the first key groove and the second key groove, and a seal provided between the inner and outer rings at the axial end portion of the inner ring;

wherein the first key groove is opened at the inner peripheral face of the inner ring in the axial end portion of the inner ring, wherein the first key groove is formed so as to have a predetermined length in the axial direction from the axial end portion of the inner ring at a position having a certain depth from an outer peripheral face of the inner ring in a radial direction, and wherein the second key groove of the rotation shaft extends outward beyond the axial end portion of the inner ring.

7. The rolling bearing apparatus of claim 6, wherein the plurality of rollers comprises tapered rollers.

8. The rolling bearing apparatus of claim 6, wherein a rotation axis of the roller is inclined relative to the rotation shaft proceeding toward the axial end portion of the inner ring.

* * * * *